(12) United States Patent
Johansson et al.

(10) Patent No.: US 12,523,914 B2
(45) Date of Patent: Jan. 13, 2026

(54) DRIVING METHODS FOR TIR-BASED IMAGE DISPLAYS

(71) Applicant: WUXI CLEARLINK LIMITED, Jiangsu (CN)

(72) Inventors: Thomas Johansson, Coquitlam, CA (US); Vivek Porush, Milpitas (CA); Graham Beales, Vancouver (CA); Peter T. Kazlas, Sudbury, MA (US)

(73) Assignee: WUXI CLEARLINK LIMITED, Wuxi (CN)

( * ) Notice: Subject to any disclaimer, the term of this patent is extended or adjusted under 35 U.S.C. 154(b) by 186 days.

(21) Appl. No.: 18/105,718

(22) Filed: Feb. 3, 2023

(65) Prior Publication Data

US 2023/0185153 A1    Jun. 15, 2023

Related U.S. Application Data

(63) Continuation of application No. 16/617,433, filed as application No. PCT/US2018/031635 on May 8, 2018, now Pat. No. 11,573,475.

(Continued)

(51) Int. Cl.
*G02F 1/1685* (2019.01)
*G02F 1/167* (2019.01)
*G02F 1/19* (2019.01)

(52) U.S. Cl.
CPC ............. *G02F 1/195* (2013.01); *G02F 1/167* (2013.01); *G02F 1/1685* (2019.01); *G02F 2203/023* (2013.01)

(58) Field of Classification Search
CPC ............... G09G 3/344; G09G 2310/06; G09G 2230/00; G09G 3/2014; G09G 3/2018;
(Continued)

(56) References Cited

U.S. PATENT DOCUMENTS

| 2004/0136047 A1 | 7/2004 | Whitehead |
| 2006/0170330 A1 | 8/2006 | Disanto |

(Continued)

FOREIGN PATENT DOCUMENTS

| CN | 1820223 A | 8/2006 |
| CN | 1882979 A | 12/2006 |
| CN | 106660003 A | 5/2017 |

OTHER PUBLICATIONS

International Search Report dated Aug. 2, 2018 as received in application No. PCT/US2018/031635.
(Continued)

*Primary Examiner* — Brandi N Thomas
(74) *Attorney, Agent, or Firm* — Maschoff Brennan

(57) ABSTRACT

Optical states in TIR-based image displays may be modulated by movement of electrophoretically mobile particles into and out of the evanescent wave region at the interface of a high refractive index convex protrusions and a low refractive index medium. The movement of particles into the evanescent wave region may frustrate TIR and form dark states at pixels. Movement of particles out of the evanescent wave region may allow for TIR of incident light to form bright states at pixels. The movement of the particles may be controlled by employing the drive methods of pulse width modulation, voltage modulation or a combination thereof.

3 Claims, 6 Drawing Sheets

Related U.S. Application Data

(60) Provisional application No. 62/506,773, filed on May 16, 2017.

(58) Field of Classification Search
CPC .............. G09G 2310/065; G02F 1/167; G02F 2001/1678; G02F 1/16757; G02F 1/1676; G02F 1/163; G02F 1/0018; G02F 1/134363; G02F 1/155; G02F 2203/023; G02F 1/1343
See application file for complete search history.

(56) References Cited

U.S. PATENT DOCUMENTS

| | | |
|---|---|---|
| 2007/0091117 A1 | 4/2007 | Zhou et al. |
| 2009/0244935 A1 | 10/2009 | Hsieh |
| 2009/0256810 A1 | 10/2009 | Pasquariello |
| 2014/0160185 A1 | 6/2014 | Okuno |
| 2015/0234250 A1 | 8/2015 | Lin |
| 2016/0246155 A1 | 8/2016 | Loxley |
| 2017/0075184 A1* | 3/2017 | Low .......................... B32B 3/30 |

OTHER PUBLICATIONS

CN First Office Action dated Dec. 20, 2022 as received in Application No. 201880043880.7.
CN Second Office Action dated Jun. 29, 2023 as received in Application No. 201880043880.7.

* cited by examiner

DRIVING METHODS FOR TIR-BASED IMAGE DISPLAYS

The instant specification claims priority to the U.S. Provisional Application Ser. No. 62/506,773, filed May 16, 2017. The instant application also claims priority to the filing date of application Ser. No. 15/438,639, filed Feb. 21, 2017, which claims priority to Provisional Application No. 61/884,854, filed Sep. 30, 2013. This application also claims priority to the application Ser. No. 15/143,708, filed May 2, 2016, which was a Continuation-In-Part (CIP) of application Ser. No. 14/903,547 (the '547 application), filed Jan. 8, 2016; the '547 application was a National Stage application of PCT application Serial No. PCT/US2013/049606 (filed Jul. 8, 2013). The specification of each of the foregoing applications is incorporated herein in its entirety.

FIELD

The disclosed embodiments generally relate to driving methods and image hold methods for total internal reflection-based image displays. In one embodiment, a total internal reflection-based ("TIR-based") image display may be driven by pulse width modulation ("PWM"). In another embodiment, a TIR-based image display may be driven by voltage modulation ("VM"). In still another embodiment, a TIR-based image display may be driven by a combination of pulse-width modulation and voltage modulation. In yet an exemplary embodiment, the driving methods may be DC balanced.

BACKGROUND

Conventional Total Internal Reflection (TIR) based displays include, among others, a transparent high refractive index front sheet in contact with a low refractive index fluid. The front sheet and fluid may have different refractive indices that may be characterized by a critical angle $\theta_c$. The critical angle characterizes the interface between the surface of the transparent front sheet (with refractive index $\eta_1$) and the low refractive index fluid (with refractive index $\eta_3$). Light rays incident upon the interface at angles less than $\theta_c$ may be transmitted through the interface. Light rays incident upon the interface at angles greater than $\theta_c$ may undergo TIR at the interface. A small critical angle (e.g., less than about 50°) is preferred at the TIR interface since this affords a large range of angles over which TIR may occur. A fluid medium with as small a refractive index ($\eta_3$) as possible may be used. A transparent front sheet composed of a material having a refractive index ($\eta_1$) preferably as large as possible may also be used. The critical angle, $\theta_c$, is calculated by the following equation (Eq. 1):

$$\theta_c = \sin^{-1}(\eta_3/\eta_1) \quad (1)$$

Conventional TIR-based reflective image displays further include electrophoretically mobile, light absorbing, particles. The electrophoretically mobile particles move in response to a bias between two opposing electrodes. When particles are moved by a voltage bias source to near the surface of the front sheet they may enter the evanescent wave region (depth of up to about 1 micron) and frustrate TIR. The evanescent wave region depth may vary due to the wavelength of the incident light, the angle of the incident light and the refractive indices of the front sheet and the medium. Incident light may be absorbed by the electrophoretically mobile particles to create a dark state observed by the viewer. Under such conditions, the display surface may appear dark or black to the viewer. When the particles are moved out of the evanescent wave region (e.g., by reverse biasing), light may be reflected by TIR. This creates white or bright states at one or more pixels that may be observed by the viewer. An array of pixelated electrodes may be used to drive the particles into and out of the evanescent wave region to form combinations of white and dark states. This may be used to create images or to convey information to the viewer.

The front sheet in prior art TIR-based displays may include a plurality of higher refractive index close-packed convex structures or protrusions on the inward side facing the lower refractive index medium and electrophoretically mobile particles (i.e., the surface of the front sheet which faces away from the viewer). The convex protrusions may be hemispherically-shaped. Other shapes may be used. The convex protrusions may have circular symmetry.

A conventional TIR-based display 100 is illustrated in FIG. 1. Display 100 is shown with a transparent front sheet 102 with outer surface 104 facing viewer 106. Display 100 further comprises a layer of a plurality 108 of individual hemispherical protrusions 110, rear support sheet 112, a transparent front electrode 114 on the surface of the plurality of hemispherical protrusions 108 and a rear electrode 116. Rear electrode 116 may comprise a passive matrix array of electrodes, a thin film transistor (TFT) array or a direct drive array of electrodes. The rear array of electrodes may be formed in an array of pixels wherein each pixel may be driven by a TFT. FIG. 1 also shows low refractive index fluid 118 which is disposed within cavity or gap 120 formed between the surface of protrusions 108 and rear support sheet 112. Fluid 118 contains a plurality of light absorbing electrophoretically mobile particles 122. Display 100 may further include voltage source 124 capable of creating a bias across cavity 120. Display 100 may further comprise one or more dielectric layers 126, 128 on front electrode 114 or rear electrode 116 or on both the front and rear electrodes, and a color filter layer 130. Color filter layer 130 may also be located between sheet 102 and protrusions 110. In some instances, display 100 may further comprise a directional front light system (optional) located on the outer surface of sheet 102 or layer 130. When particles 122 are electrophoretically moved towards front electrode 114 and into the evanescent wave region, they may frustrate TIR. This is shown to the right of dotted line 132 and is illustrated by incident light rays 134 and 136 being absorbed by the particles 114. This area of the display, such as at a pixel, may appear as a dark state to viewer 106.

When particles are moved away from front sheet 102 and the evanescent wave region towards rear electrode 116 (as shown to the left of dotted line 132) incident light rays may be totally internally reflected at the interface of the surface of electrode 126 on hemispherical array 108 and medium 118. This is represented by incident light ray 138, which is totally internally reflected and exits the display towards viewer 106 as reflected light ray 140. The display pixel appears white or bright to the viewer.

Conventional TIR-based image display 100 may further comprise cross walls 142. Cross walls 142 may comprise a dielectric layer 144. Conventional TIR-based image display 100 may further comprise a front light system 146. Front light system 146 may comprise light source 148 and waveguide 150.

Optical states in TIR-based image displays may be modulated by movement of electrophoretically mobile particles into and out of the evanescent wave region at the interface of a high refractive index convex protrusions and a low refractive index medium. The movement of the particles may be controlled by employing the drive methods of pulse width modulation, voltage modulation or a combination thereof. These drive methods may also be used to hold image states.

BRIEF DESCRIPTION OF DRAWINGS

These and other embodiments of the disclosure will be discussed with reference to the following exemplary and non-limiting illustrations, in which like elements are numbered similarly, and where.

DETAILED DESCRIPTION

Throughout the following description specific details are set forth in order to provide a more thorough understanding to persons skilled in the art. However, well-known elements may not have been shown or described in detail to avoid unnecessarily obscuring the disclosure. Accordingly, the description and drawings are to be regarded in an illustrative, rather than a restrictive or exclusive, sense.

This disclosure generally relates to improved performance in TIR-based image displays. According to certain embodiments of the disclosure, an appropriate waveform may be applied using the method of pulse-width modulation (PWM). In exemplary embodiments, appropriate waveforms may be applied using voltage modulation (VM). In other embodiments, a combination of PWM and VM may be used to drive a TIR-based image display. In an exemplary embodiment, the waveforms may be substantially direct current (DC) balanced (It should be know that a DC balanced display is where the mean amplitude in a waveform is about zero. DC balanced displays substantially prevent the buildup of charge at locations within the display). In certain embodiments, the applied waveform comprises at least one voltage for a specific duration of time. The magnitude and duration of the applied voltages may be designed to move an amount of charge and maintain the position of that charge for the duration of a drive waveform. The methods described herein may be applied to control the movement of electrophoretically mobile particles into and out of the evanescent wave region to form dark states, white states or intermediate gray states in TIR-based image displays.

Figure 2:
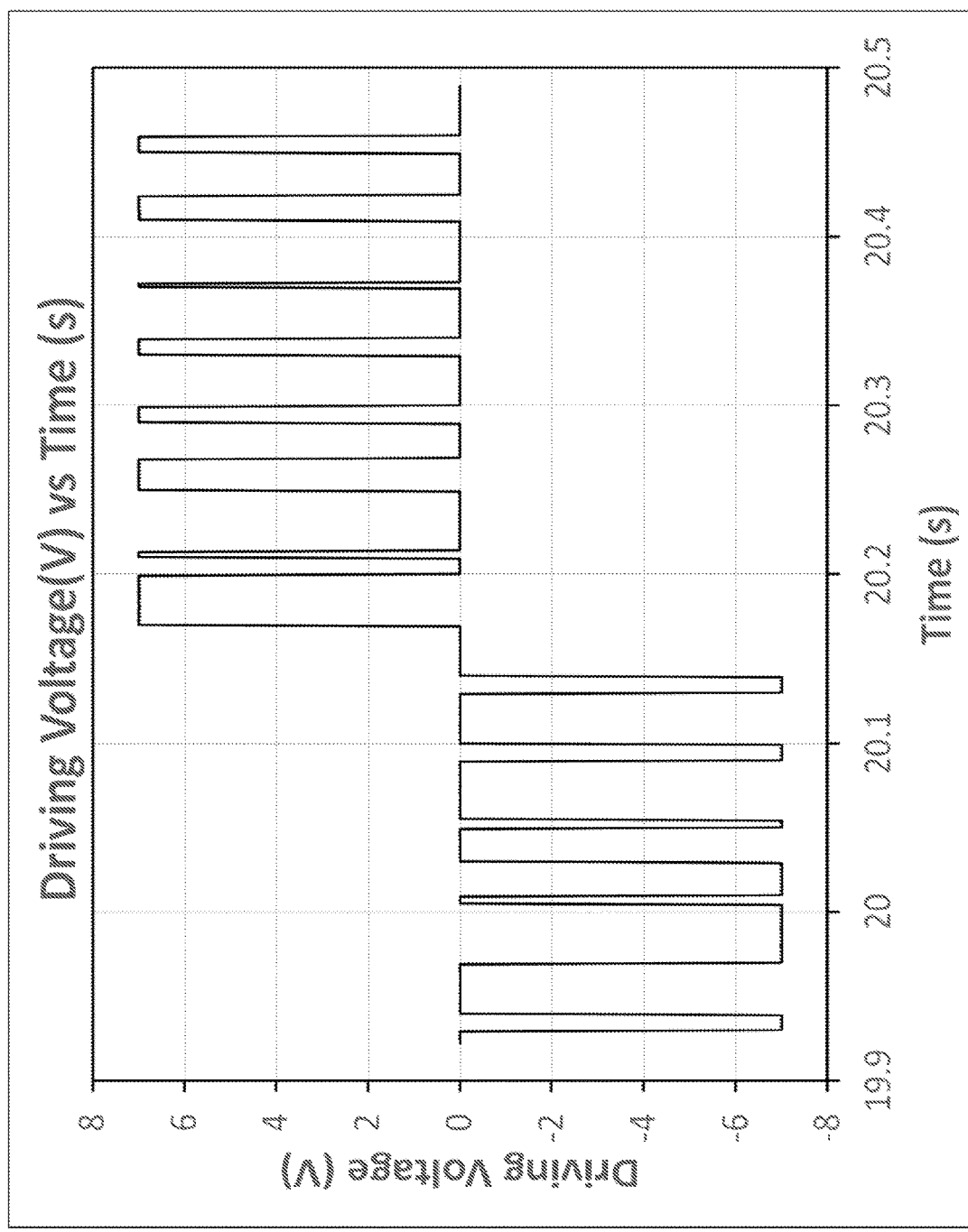
FIG. 2 is an example of a PWM-based waveform.

PWM is a type of digital signal. PWM comprises a fixed frequency wherein the voltage may be either "ON" or "OFF". In an exemplary embodiment, this frequency may be much greater than the response time of the electrophoretically mobile particles. PWM of reflective displays typically comprises two voltages such as +V or −V. For example, if the drive voltage pulse over an imaging pixel (or may be across a cell) is +10V, the other voltage that may be used is −10V. The time for which the voltage pulse is applied may be varied from period to period. FIG. 2 is an example of a PWM-based waveform. The x-axis in FIG. 2 is time (seconds) and the y-axis is the driving voltage (V). The example waveform to drive a TIR-based image display in FIG. 2 has a frequency of 25 Hz wherein the waveform is composed of 40 millisecond (ms) periods (It should be known that other periods of time may be used. The examples used herein are for illustrative purposes only). By way of example, each pulse width interval comprises a drive voltage of +7V or −7V and a rest voltage at about 0V. When a drive voltage is applied, this is considered "ON" time. When there is no drive voltage being applied, this is considered "OFF" time. Within a single 40 ms period, if a drive voltage is applied 20 ms of time while resting 20 ms, this is considered a 50% duty cycle. Duty cycle is typically measured in % of ON time per period.

In some other embodiments, a TIR-based image display may be driven by a waveform using the PWM method wherein the drive voltages may be in the range of about −20V to about +20V. In some embodiments, the drive voltages may be in the range of about −15V to about +15V. In other embodiments, the drive voltages may be in the range of about −10V to about +10V. In exemplary embodiments, the drive voltages may be in the range of about −7V to about +7V. In still other embodiments, the drive voltages may be in the range of about −5V to about +5V. In some embodiments, the PWM frequency utilized to drive a TIR-based image display may be in the range of about 1000 Hz (1 ms period) to about 1 Hz (1 s period). In other embodiments, the PWM frequency may be in the range of about 1000 Hz (1 ms periods) to about 10 Hz (100 ms periods). In still other embodiments, the PWM frequency may be in the range of about 1000 Hz (1 ms periods) to about 20 Hz (50 ms periods). In exemplary embodiments, the PWM frequency may be in the range of about 200 Hz (5 ms periods) to about 20 Hz (50 ms periods). In some embodiments, a TIR-based image display may be driven by at least one period with a duty cycle in the range of about 0-100%. In an exemplary embodiment, the PWM drive methods described herein to drive a TIR-based image display may be substantially direct current (DC) balanced. DC balanced displays substantially prevent charge build up within the display which may further prevent degradation of the display components.

Figure 1:
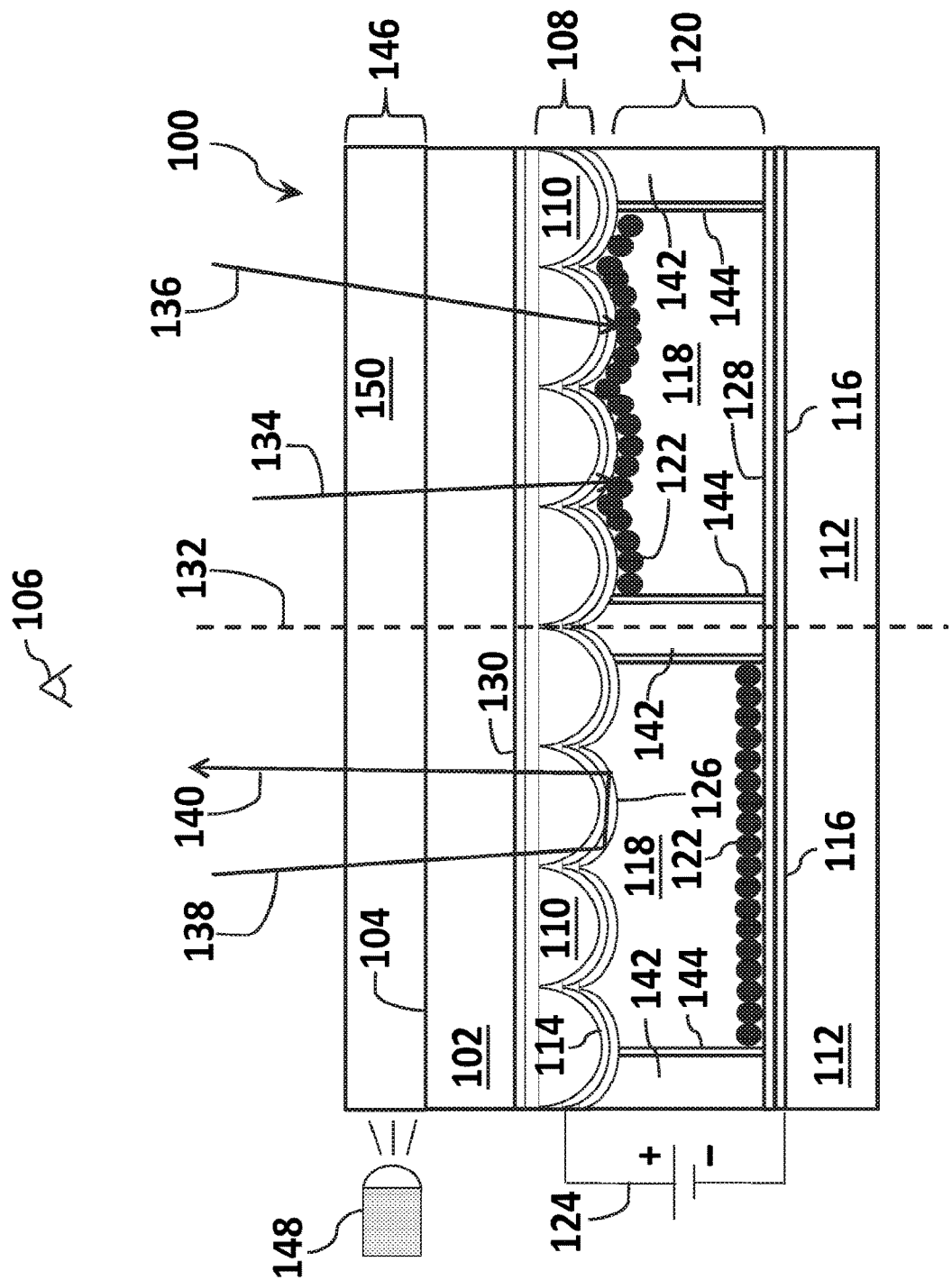
FIG. 1 schematically illustrates a cross-section of a conventional TIR-based display.
Figure 3A:
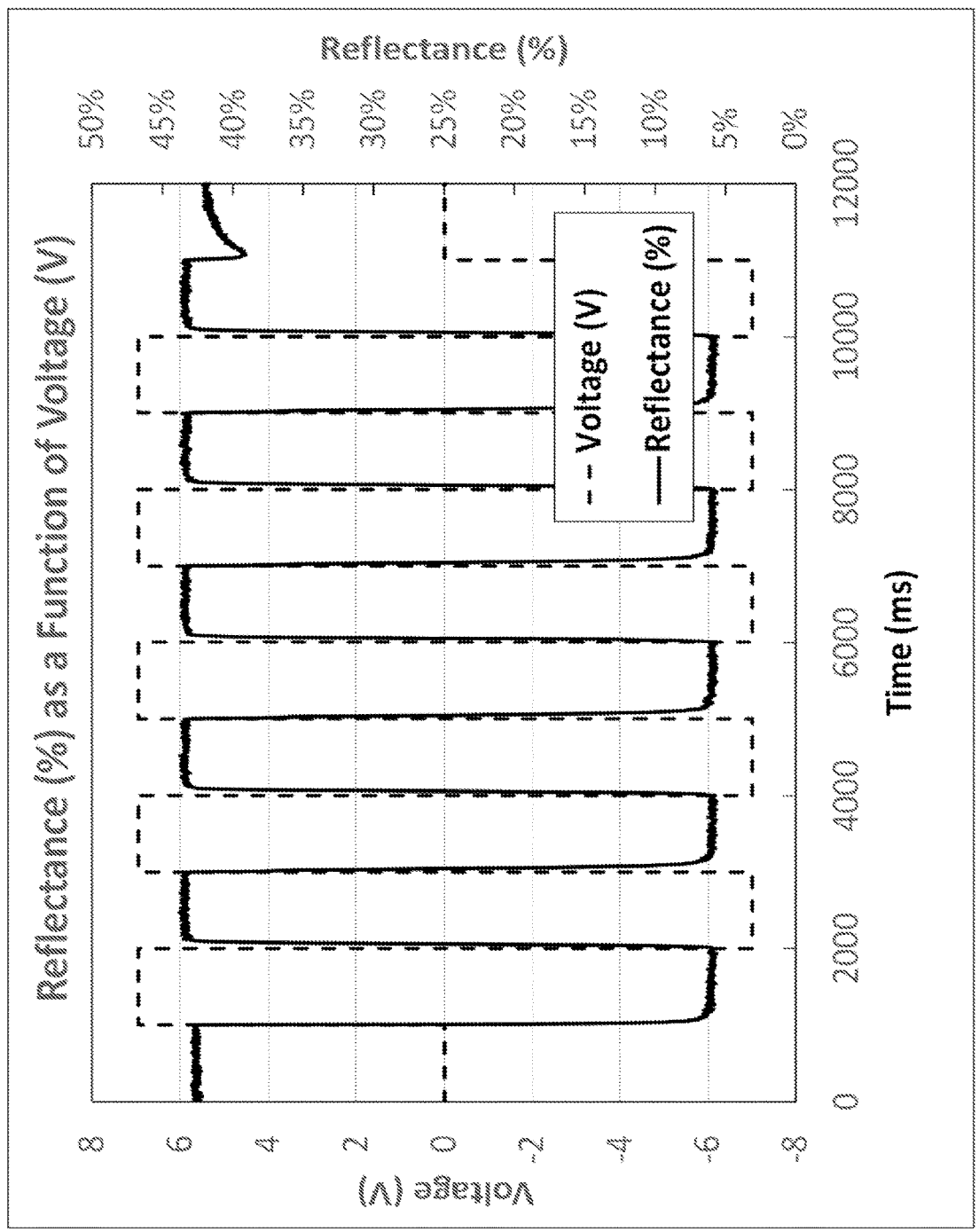
FIG. 3A schematically illustrates an example of a waveform utilizing voltage modulation to drive a TIR-based image display.

In some embodiments, a TIR-based image display may be driven by voltage modulation. Voltage modulation (VM) may also be referred to as amplitude modulation. FIG. 3A schematically illustrates an example of a waveform utilizing voltage modulation to drive a TIR-based image display. The driving method of VM utilizes voltage pulses of variable amplitude to drive the display. The pulse width (i.e., duration of time the voltage is applied) is constant. The example in FIG. 3A illustrates an example of driving a TIR-based display previously described herein. The data shown in FIG. 3A illustrate % reflectance as a function of drive voltage (V) over a period of time (milliseconds). In this example, the electrophoretically mobile particles comprise a positive charge polarity. The drive electrode used to apply the waveform comprising ±7V drive voltages shown on the primary y-axis on the left side of the plot in FIG. 3A is the rear electrode. In some embodiments, the drive electrode may be the front electrode. The drive voltages are denoted by a dotted line (- - -). Each voltage is applied for approximately one second. As a positive voltage is applied, the positively charged particles are moved in a direction away from the rear electrode towards the front transparent electrode and into the evanescent wave region near the interface of high refractive index protrusions 110 and low refractive index medium 118. In this location, the particles may frustrate TIR and absorb incident light leading to a dark state at a pixel in the display. This is illustrated by incident light rays 134, 136 in FIG. 1. As a result, the % reflectance decreases as shown on the second y-axis on the right side of the plot in FIG. 3A. The % reflectance is denoted by a solid line and is overlaid on top of the drive voltage (dotted line).

When a negative voltage is applied, such as −7V shown in the plot in FIG. 3A, the positively charged particles move out of the evanescent wave region towards the rear drive electrode. As the particles move out of the evanescent wave region, incident light is allowed to be totally internally reflected at a pixel in the display as illustrated by light rays 138, 140 in FIG. 1. As a result, the % reflectance increases to about 43-44% as shown on the second y-axis on the right side of the plot in FIG. 3A. In an exemplary embodiment, PWM may also be used to hold an optical state after a driving waveform.

Figure 3B:
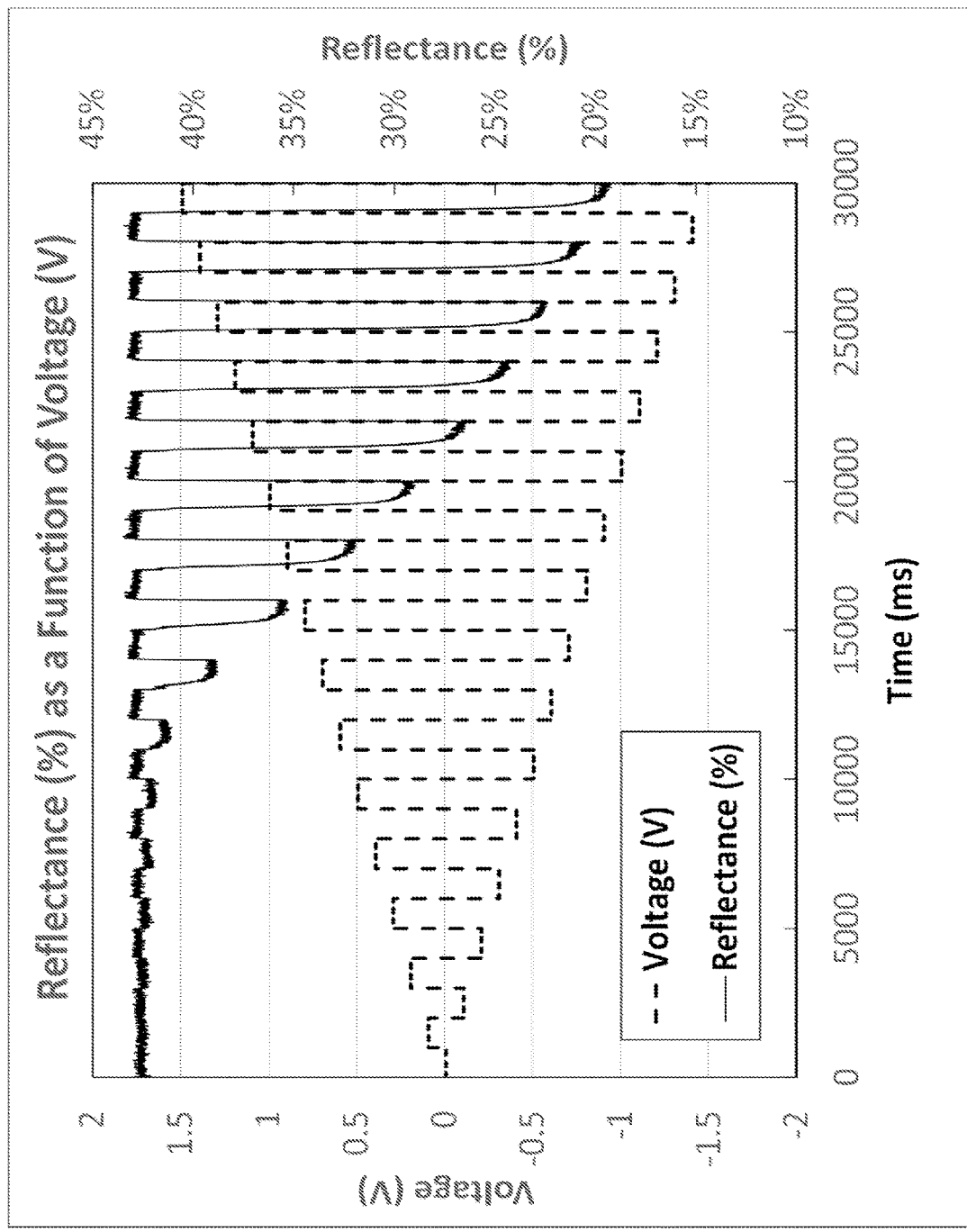
FIG. 3B schematically illustrates an example of a waveform utilizing voltage modulation to drive a TIR-based image display.

FIG. 3B schematically illustrates an example of a waveform utilizing voltage modulation to drive a TIR-based image display to achieve different optical states including substantially black, substantially white and various gray levels/states. The data shown in FIG. 3B illustrates % reflectance (solid line) as a function of drive voltage (dotted line) over a period of time. In this example, the % reflectance is modulated as the voltage is cycled from 0V to 1.5V and 0V to −1.5V in 0.1V increments. Each voltage is applied for approximately one second. When the voltage is applied in the range of 0V to −1.5V, the positively charged particles are moved toward the rear drive electrode and out of the evanescent wave region. This leads to a bright state with % reflectance of about 43%. When the voltage is applied in the range of 0V to +1.5V, the positively charged particles are moved away from the rear drive electrode, towards the front transparent electrode and into the evanescent wave region. This leads to frustration of TIR and a dark state at a pixel in the display. As can be further seen in the plot in FIG. 3B, as the applied voltage is incrementally increased from 0V to 1.5V at pulse widths of one second, the corresponding % reflectance values decreases incrementally. The dark state reflectance decreases from about 43% down to about 19% as the drive voltage decreases from about 0V to about −1.5V.

In some embodiments, the drive voltage in a VM driven display may be 0V. In other embodiments, the drive voltage in a VM driven TIR-based display may be in the range of about −15V to about +15V. In still other embodiments, the drive voltages in a VM driven TIR-based display may be in the range of about −10V to about +10V. In an exemplary embodiment, the drive voltages in a VM driven TIR-based display may be in the range of about −8V to about +8V. In an exemplary embodiment, the drive voltages in a VM driven TIR-based display may be in the range of about −5V to about +5V. In some embodiments, the applied voltages using VM may be applied in increments of about 0.001V or greater. In other embodiments, the applied voltages using VM may be applied in increments in the range of about ±0.001-15V. In still other embodiments, the applied voltages using VM may be applied in increments in the range of about ±1-10V. In some embodiments, the speed to switch from one voltage to another voltage in a VM driven TIR-based image display may be in the range of about 0.001 seconds or greater. In other embodiments, the speed to switch from one voltage to another voltage in a VM driven TIR-based image display may be in the range of about 0.001-10 seconds. In still other embodiments, the speed to switch from one voltage to another voltage in a VM driven TIR-based image display may be in the range of about 0.001-0.1 seconds. In an exemplary embodiment, the VM drive methods described herein to drive a TIR-based image display may be substantially DC balanced. In an exemplary embodiment, VM may also be used to hold an image after a driving waveform.

Figure 4:
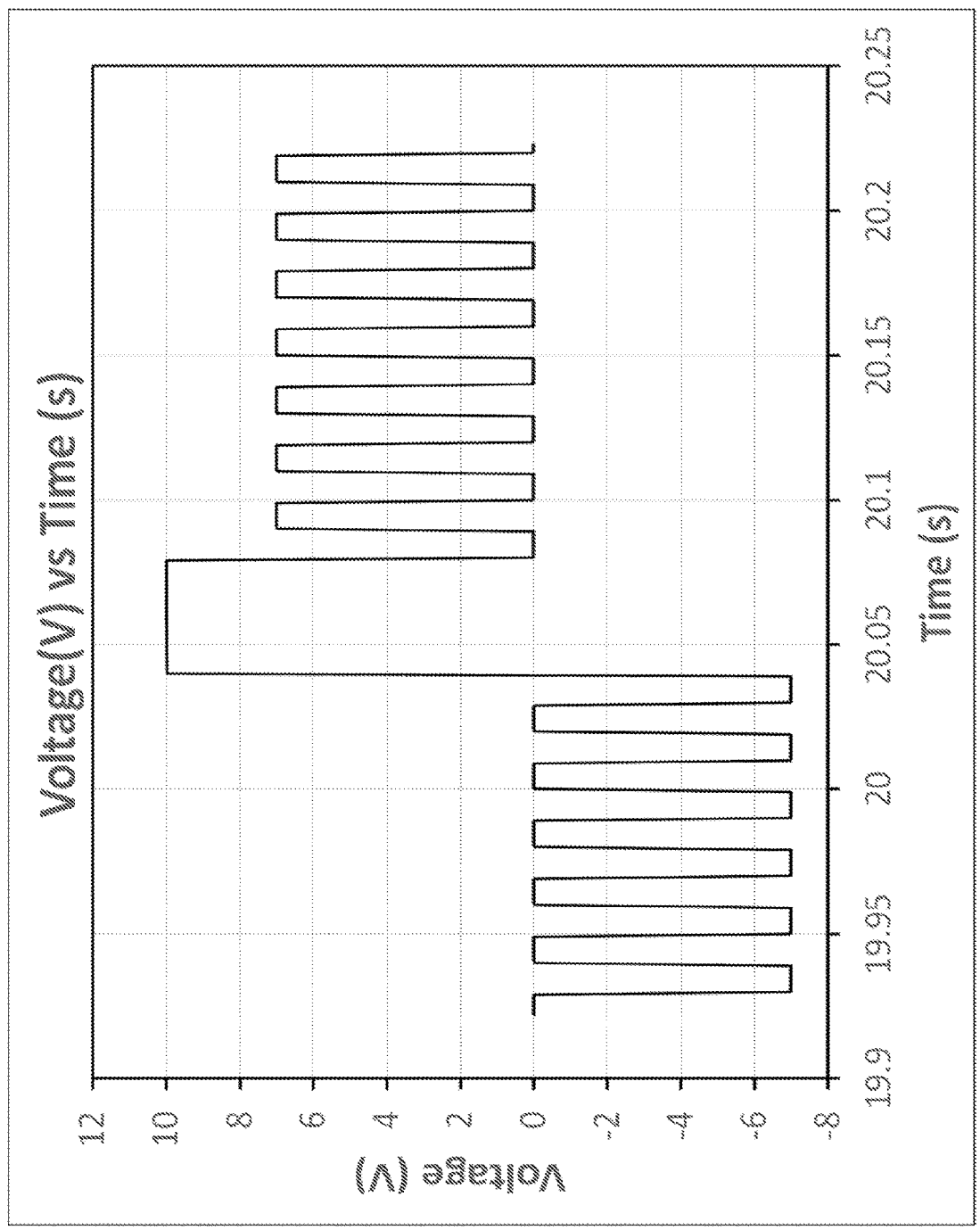
FIG. 4 graphically illustrates a driving waveform of varying amplitudes and pulse widths.

FIG. 4 graphically illustrates a driving waveform of varying amplitudes and pulse widths. The method to drive a TIR-based image display illustrated in the plot in FIG. 4 is a hybrid-like method comprising elements of PWM and VM. The example waveform in FIG. 4 comprises initially a series of −7V pulses of the same pulse width of about 10 milliseconds. At about the 20.04 s mark, a +10V voltage pulse is applied for a period of about 40 milliseconds. This is followed by a series of +7V pulses for a length of about 10 milliseconds. As shown, the waveform may comprise one or more different voltage amplitudes and one or more different pulse widths. In an exemplary embodiment, a TIR-based image display may be driven by a combination of PWM and VM to move electrophoretically mobile particles into and out of the evanescent wave region to modulate optical states at one or more pixels. In an exemplary embodiment, the methods of PWM and VM may also be used to hold particles at a location after a driving waveform. In an exemplary embodiment, the hybrid-like method comprising elements of PWM and VM drive methods described herein to drive a TIR-based image display may be substantially DC balanced.

In the exemplary display embodiments described herein, they may be used in Internet of Things (IoT) devices. The IoT devices may comprise a local wireless or wired communication interface to establish a local wireless or wired communication link with one or more IoT hubs or client devices. The IoT devices may further comprise a secure communication channel with an IoT service over the internet using a local wireless or wired communication link. The IoT devices comprising one or more of the display devices described herein may further comprise a sensor. Sensors may include one or more of a temperature, humidity, light, sound, motion, vibration, proximity, gas or heat sensor. The IoT devices comprising one or more of the display devices described herein may be interfaced with home appliances such as a refrigerator, freezer, television (TV), close captioned TV (CCTV), stereo system, heating, ventilation, air conditioning (HVAC) system, robotic vacuum, air purifiers, lighting system, washing machine, drying machine, oven, fire alarms, home security system, pool equipment, dehumidifier or dishwashing machine. The IoT devices comprising one or more of the display devices described herein may be interfaced with health monitoring systems such as heart monitoring, diabetic monitoring, temperature monitoring, biochip transponders or pedometer. The IoT devices comprising one or more of the display devices described herein may be interfaced with transportation monitoring systems such as those in an automobile, motorcycle, bicycle, scooter, marine vehicle, bus or airplane.

In the exemplary display embodiments described herein, they may be used IoT and non-IoT applications such as in, but not limited to, electronic book readers, portable computers, tablet computers, cellular telephones, smart cards, signs, watches, wearables, military display applications, automotive displays, automotive license plates, shelf labels, flash drives and outdoor billboards or outdoor signs comprising a display. The displays may be powered by one or more of a battery, solar cell, wind, electrical generator, electrical outlet, AC power, DC power or other means.

Figure 5:
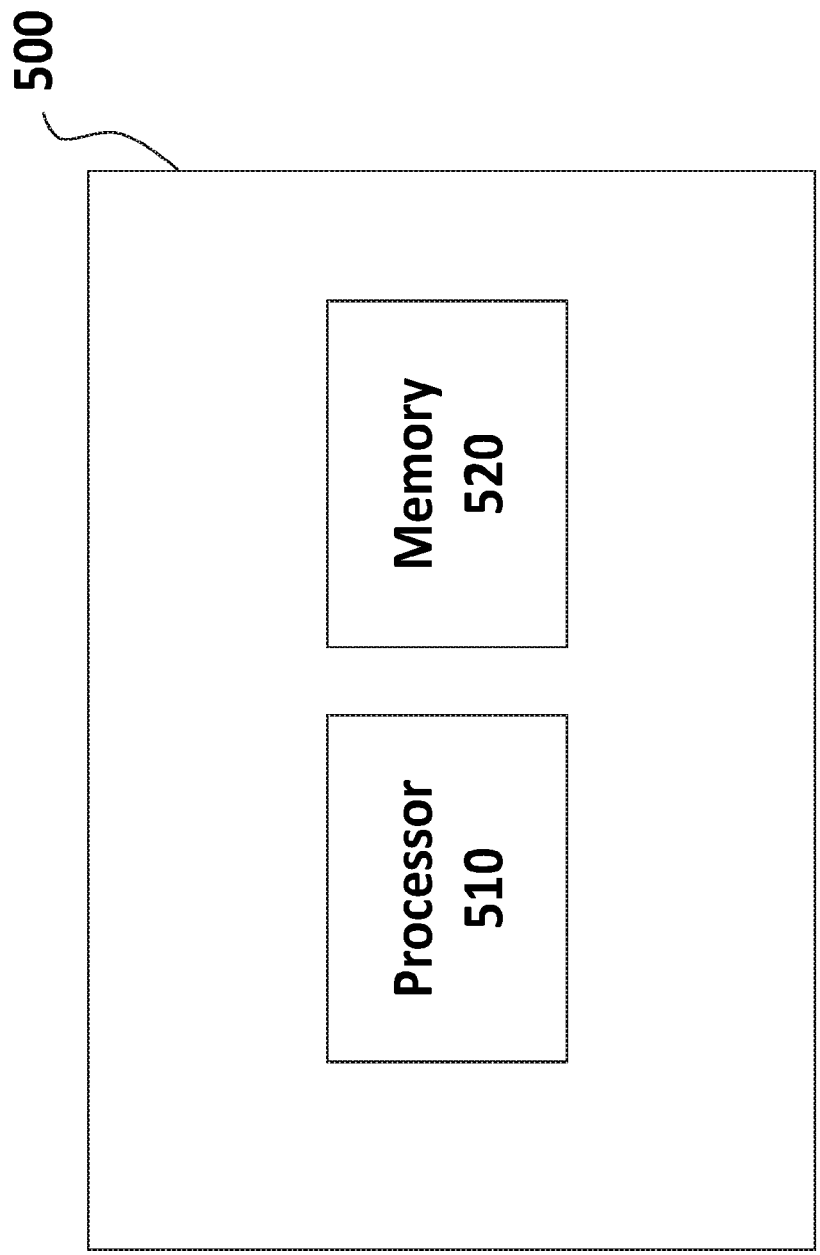
FIG. 5 shows an exemplary controller that may be used with a TIR display according to one embodiment of the disclosure.

An exemplary embodiment of the disclosure relates to an apparatus and system to control reflection of an incoming ray of light through a TIR display. FIG. 5 shows one such exemplary embodiment. Specifically, FIG. 5 shows controller 500 which may be used in or along with a TIR display according to one embodiment of the disclosure. Controller 500 may include processor 510 in communication with memory 520. Processor 510 may comprise hardware, software or a combination of hardware and software. Memory 520 may comprise hardware, software or a combination of hardware and software. Memory 510 may comprise instructions which may be executed by processor 510 to cause the display to provide an image or to provide partial or total internal reflection. The instructions may include non-transitory instructions that may be implemented or executed on the processor. In certain embodiments, memory 520 communicates with processor 510 to cause processor 510 implement total or partial internal reflection at the TIR. For example, memory 510 may include instructions to cause processor 520 to implement the following steps: apply a first drive voltage to cause movement of the electrophoretically mobile particle from the front electrode towards the rear electrode for a first duration; maintain the first drive voltage for a second duration; apply a second drive voltage to cause movement of the electrophoretically mobile particle from the rear electrode towards the front electrode for a third duration; maintain the third drive for a fourth duration. The front electrode may be similar to those described above, for example, including a plurality of semi-hemispherical protrusions. The processor may cause application of a first drive voltage and the second drive voltage to move the electrophoretically mobile particle out of the evanescent wave region in a TIR-based display.

The following exemplary and non-limiting illustrate different embodiments of the disclosure. Example 1 is directed to a method to control movement of an electrophoretically mobile particle in a medium interposed between a front electrode and a rear electrode of a TIR display, the front electrode having a plurality of semi-hemispherical protrusions, the method comprising: applying a first drive voltage to cause movement of the electrophoretically mobile particle from the front electrode towards the rear electrode for a first duration; maintaining the first drive voltage for a second duration; applying a second drive voltage to cause movement of the electrophoretically mobile particle from the rear electrode towards the front electrode for a third duration; maintaining the third drive voltage for a fourth duration; wherein the steps of applying the first drive voltage and the second drive voltage causes the electrophoretically mobile particle to move into and out of the evanescent wave region in a TIR-based display.

Example 2 is directed to the method of example 1, wherein the first drive voltage is in a range of about −15V to 15V and wherein the second voltage is in the range of about 15V to −15V.

Example 3 is directed to the method of example 1, wherein the second duration is substantially longer than the fourth duration.

Example 4 is directed to the method of example 1, wherein the second duration is substantially equal to the fourth duration.

Example 5 is directed to the method of example 1, wherein the second duration is substantially shorter than the fourth duration.

Example 6 is directed to the method of example 1, wherein the evanescent wave region defines a region proximal to the plurality of convex protrusions.

Example 7 is directed to the method of example 1, wherein the step of applying the second drive voltage further comprises moving the electrophoretically mobile particle from the rear electrode towards the front electrode and substantially absorbing an incoming light ray at the evanescent wave region by the electrophoretically mobile particle.

Example 8 is directed to the method of example 1, wherein the step of applying a first drive voltage further comprises moving the electrophoretically mobile particle from the front electrode towards the rear electrode and allowing an incoming light ray to be substantially reflected at the evanescent wave regions.

Example 9 is directed to the method of example 8, wherein the incoming light ray is substantially reflected at a corresponding convex protrusion.

Example 10 is directed to the method of example 1, wherein the drive voltages are controlled at a pixel by at least one TFT.

Example 11 is directed to an apparatus controller to control movement of an electrophoretically mobile particle in a medium interposed between a front electrode and a rear electrode of a TIR display, the controller comprising: a processer; a memory in communication with the processor, the memory comprising instructions to cause the processor to: apply a first drive voltage to cause movement of the electrophoretically mobile particle from the front electrode towards the rear electrode for a first duration; maintain the first drive voltage for a second duration; apply a second drive voltage to cause movement of the electrophoretically mobile particle from the rear electrode towards the front electrode for a third duration: maintain the third drive for a fourth duration; wherein the front electrode includes a plurality of convex protrusions, and wherein the processor applies the first drive voltage and the second drive voltage to move the electrophoretically mobile particle out of the evanescent wave region in a TIR-based display.

Example 12 is directed to the apparatus of example 11, wherein the second duration is substantially longer than the fourth duration.

Example 13 is directed to the apparatus of example 11, wherein the second duration is substantially equal to the fourth duration.

Example 14 is directed to the apparatus of example 11, wherein the second duration is substantially shorter than the fourth duration.

Example 15 is directed to the apparatus of example 11, wherein the evanescent wave region defines a region proximal to the plurality of convex protrusions.

Example 16 is directed to the apparatus of example 11, wherein the step of applying the second drive voltage further comprises moving the electrophoretically mobile particle from the rear electrode towards the front electrode and substantially absorbing an incoming light ray at the evanescent wave region by the electrophoretically mobile particle.

Example 17 is directed to the apparatus of example 11, wherein the step of applying a first drive voltage further comprises moving the electrophoretically mobile particle from the front electrode towards the rear electrode and allowing an incoming light ray to be substantially reflected at the evanescent wave regions.

Example 18 is directed to the apparatus of example 17, wherein the incoming light ray is substantially reflected at a corresponding convex protrusion.

While the principles of the disclosure have been illustrated in relation to the exemplary embodiments shown herein, the principles of the disclosure are not limited thereto and include any modification, variation or permutation thereof.

The invention claimed is:

1. A method to control movement of an electrophoretically mobile particle in a medium interposed between a front electrode and a rear electrode of a total internal reflection (TIR) display, the method comprising:
    driving the electrophoretically mobile particle to a target electrode by applying a first waveform comprising a first drive voltage applied for a first duration; and
    holding the electrophoretically mobile particle at the target electrode by applying a second waveform comprising a series of drive voltages applied over a second duration to maintain the electrophoretically mobile particle at the target electrode, wherein
    the series of drive voltages alternate between a second drive voltage and a third drive voltage,
    the second drive voltage is less than the first drive voltage but more than 0V, and
    the third drive voltage is approximately 0V, and wherein
    after the second duration, applying a third waveform comprising a fourth drive voltage applied for a third duration.

2. The method of claim 1, wherein:

a polarity of the fourth drive voltage is opposite to a polarity of the first and second drive voltages and a mean amplitude of the first, second, third, and fourth waveforms is approximately zero.

3. The method of claim 2, wherein:

a magnitude of the fourth drive voltage is larger than a magnitude of the first drive voltage, and the third duration is less than the second duration.

* * * * *